US012786701B2

(12) United States Patent

Lu et al.

(10) Patent No.: US 12,786,701 B2

(45) Date of Patent: Nov. 3, 2026

(54) CARD READING TERMINAL FOR READING CARD AND WORKING METHOD THEREOF

(71) Applicant: FEITIAN TECHNOLOGIES CO., LTD., Beijing (CN)

(72) Inventors: Zhou Lu, Beijing (CN); Huazhang Yu, Beijing (CN)

( * ) Notice: Subject to any disclaimer, the term of this patent is extended or adjusted under 35 U.S.C. 154(b) by 238 days.

(21) Appl. No.: 18/029,553

(22) PCT Filed: Dec. 3, 2021

(86) PCT No.: PCT/CN2021/135342

§ 371 (c)(1),
(2) Date: Mar. 30, 2023

(87) PCT Pub. No.: WO2022/143008

PCT Pub. Date: Jul. 7, 2022

(65) Prior Publication Data

US 2023/0370838 A1 Nov. 16, 2023

(30) Foreign Application Priority Data

Dec. 30, 2020 (CN) ........................ 202011631183.9

(51) Int. Cl.
*H04L 9/32* (2006.01)
*H04W 12/04* (2021.01)

(52) U.S. Cl.
CPC .................................. *H04W 12/04* (2013.01)

(58) Field of Classification Search
CPC .................................................... H04W 12/04
USPC ........................................................ 713/171
See application file for complete search history.

(56) References Cited

U.S. PATENT DOCUMENTS

2011/0280406 A1* 11/2011 Ma .......................... H04L 9/083
380/278

* cited by examiner

*Primary Examiner* — Jeffrey C Pwu
*Assistant Examiner* — Samuel Ambaye
(74) *Attorney, Agent, or Firm* — Sang Young Han

(57) ABSTRACT

A card reading terminal. The card reading terminal comprises a receiving module, a first determining module, a first judging module, a first acquiring module, a second determining module, a second acquiring module, a third acquiring module, a first obtaining module, a fourth acquiring module, a first decrypting module, a generating module, a second obtaining module, an updating module, a third obtaining module, a fourth obtaining module, a reading module, a second judging module, an identifying module, a fifth obtaining module, a third judging module, an executing module, a fifth acquiring module, a sixth acquiring module, an encrypting module, a second decrypting module, and a sending module. According to the present invention, communication data between the card reading terminal and a card is secured, and is thus difficult to be intercepted, leaked, or tampered with, such that security is greatly improved.

20 Claims, 7 Drawing Sheets

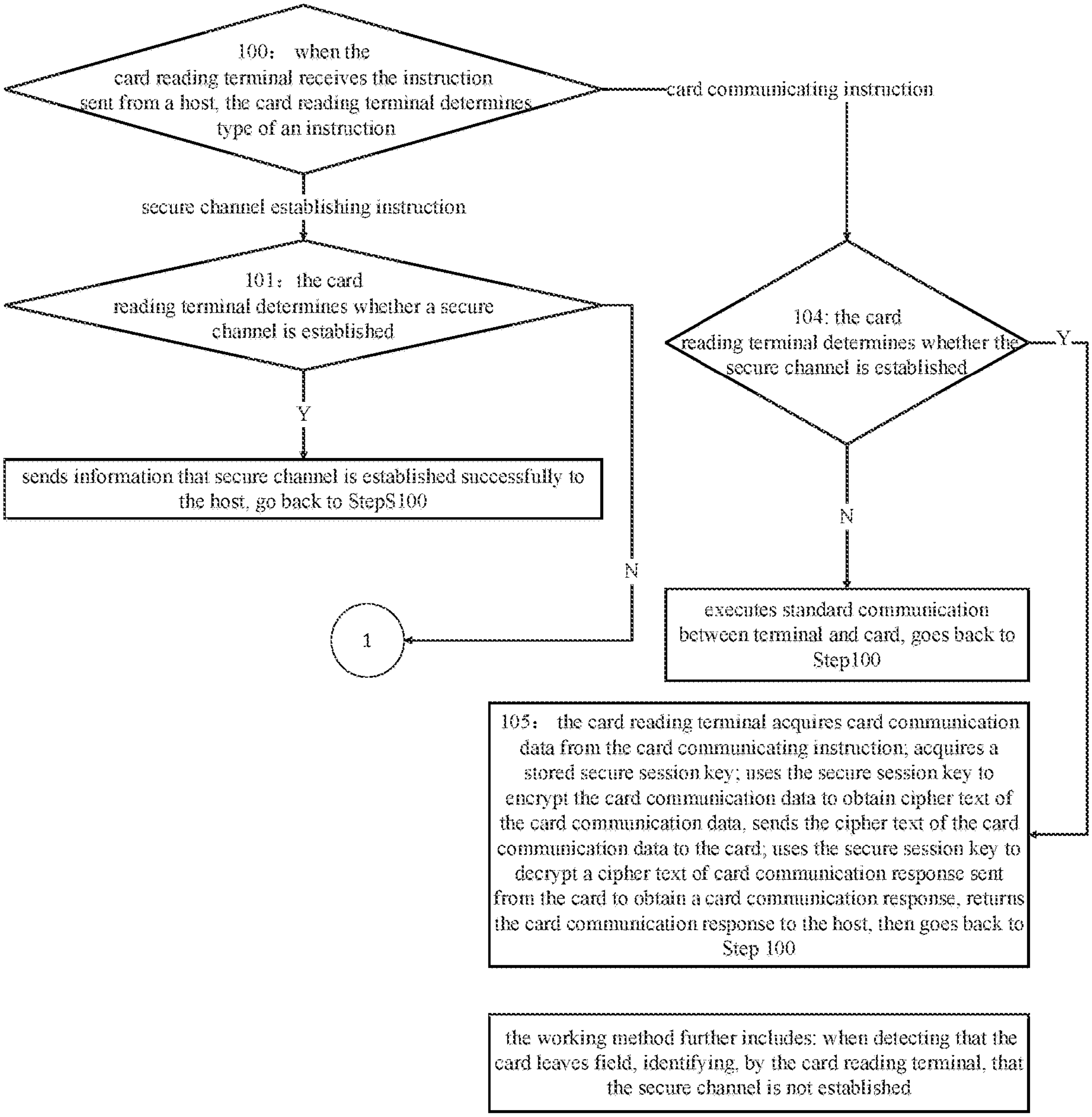
Fig. 1 (to continue)

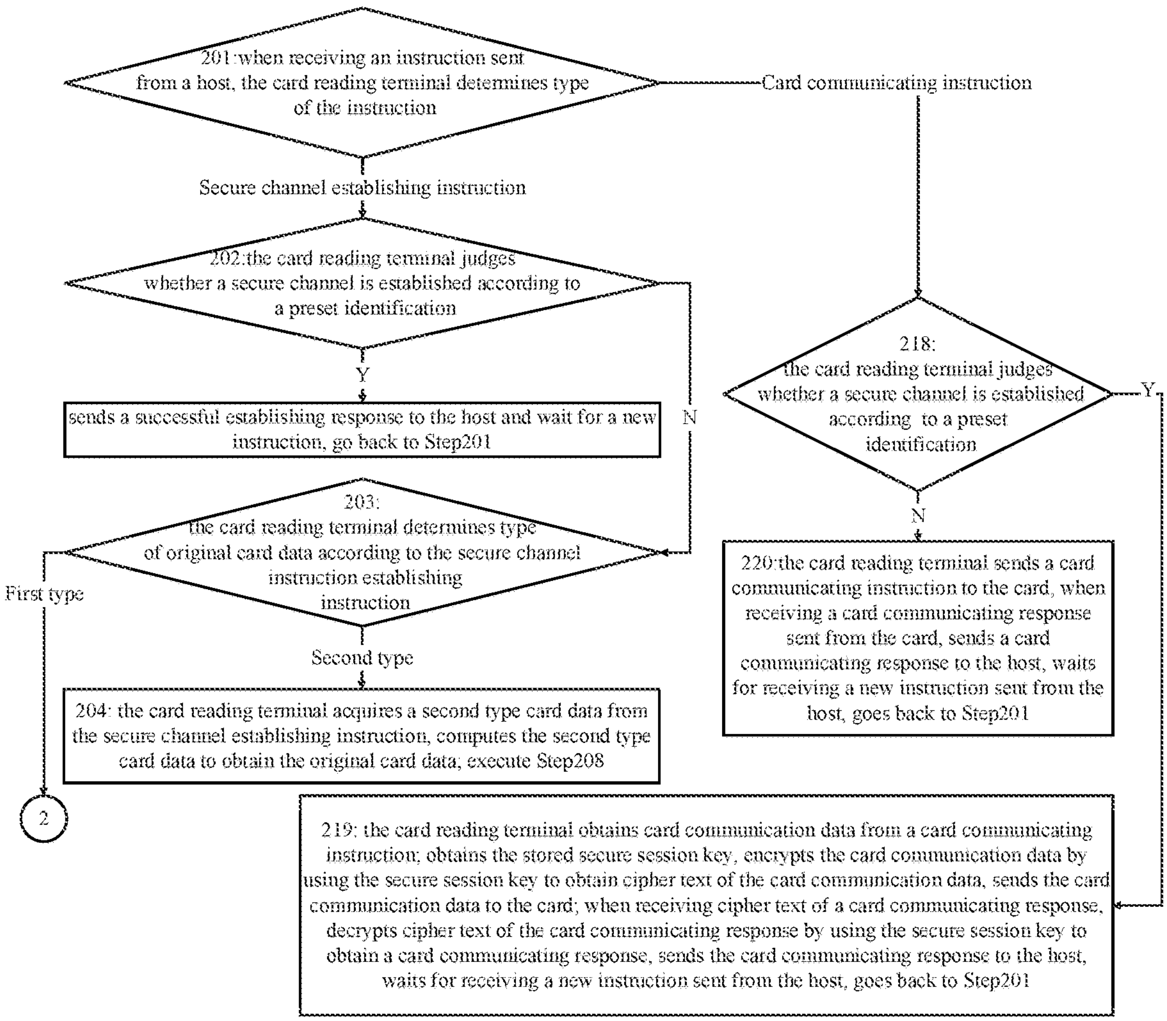
Fig. 2 (to continue)

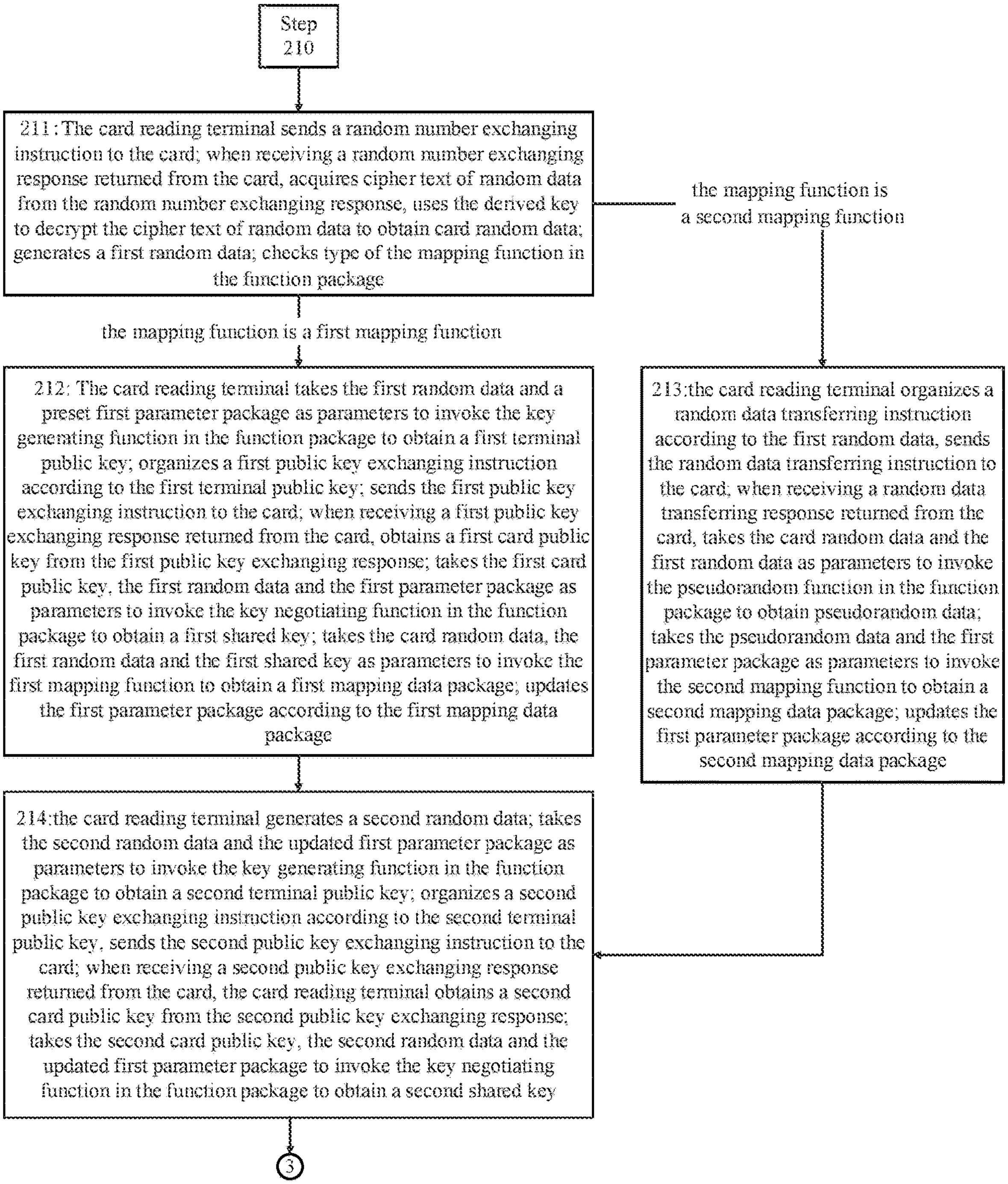
Fig. 3 (to continue)

CARD READING TERMINAL FOR READING CARD AND WORKING METHOD THEREOF

TECHNICAL FIELD

The present invention relates to a terminal for reading a card and method for operating the same, which belongs to communication security technology field.

PRIOR ART

Cards are widely used everywhere in human life. Because there are many types of cards, the meaning scope of a card reading terminal which supports using a card is wide as well. Generally, a working method of a card reading terminal is: after acquiring a host instruction from a host, the card reading terminal sends the host instruction to the card directly; when receiving a host response returned from the card, the card reading terminal sends the host response to the host; there is no secure processing of communication data between the card reading terminal and the card, therefore the communication data is easily to be intercepted, leaked or tampered and security level is low. In prior art, it requires a card reading terminal and a working method thereof to solve this problem.

SUMMARY OF THE INVENTION

The object of the present invention is to provide a terminal for reading a card and working method therefor, which securely processes communicating data between the card reading terminal and the card. Therefore, it is hard to intercept, leak or tamper the communication, which improves a security greatly.

Thus, according to one aspect of the present invention, there is provided a working method for a card reading terminal, which comprises the following steps:

Step S00, when receiving an instruction sent from a host, the card reading terminal determines a type of the instruction, if the instruction is a secure channel establishing instruction, execute Step S01; while if the instruction is card communicating instruction, execute Step S04;

Step S01, the card reading terminal judges whether a secure channel is established, if yes, sends information that secure channel is established successfully to the host, then goes back to Step S00; otherwise, executes Step S02;

Step S02, the card reading terminal acquires a card parameter of a card, determines an objective identifier according to the card parameter, acquires a function package corresponding to the objective identifier, acquires original card data; obtains a derived key according to a preset second parameter package, the original card data and the function package, acquires cipher text of random data from the card, obtains card random data; generates random data package; obtains a mapping data package according to the card random data, the random data package, a preset first parameter package and the function package; updates the first parameter package according to the mapping data package; obtains a session key package according to the random data package, the updated first parameter package and the second parameter package; then executes Step S03;

Step S03, the card reading terminal obtains a terminal authenticated token according to the session key package and the function package; reads a card authenticated token from the card according to the terminal authenticated token, judges whether the secure channel is established successfully according to the terminal authenticated token and the card authenticated token, if yes, identifies that secure channel is established and obtains a secure session key according to the session key package; sends information that establishing secure channel is successful to the host, goes back to Step S00; otherwise, sends information that establishing the secure channel is failed to the host, then goes back to Step S00;

the card reading terminal judges whether the secure channel is established, if yes, executes Step S05; otherwise, executes a standard communication between the terminal and the card, then goes back to Step S00;

Step S05, the card reading terminal obtains card communication data from the card communicating instruction; obtains the secure session key; uses the secure session key to encrypt the card communicating data to obtain a cipher text of the card communicating data, sends the cipher text of the card communicating data to the card; uses the secure session key to decrypt a cipher text of card communicating response sent from the card to obtain a card communicating response, and returns the card communicating response to the host, then goes back to Step S00; and the working method further comprises: when detecting that the card leaves the terminal, the card reading terminal identifies that the secure channel is not established.

According to another aspect of the present invention, there is provided a terminal for reading a card, which includes a receiving module, a first determining module, a first judging module, a first acquiring module, a second determining module, a second acquiring module, a third acquiring module, a first obtaining module, a fourth acquiring module, a first decrypting module, a generating module, a second obtaining module, an updating module, a third obtaining module, a fourth obtaining module, a reading module, a second judging module, a identifying module, a fifth obtaining module, a third judging module, an executing module, a fifth acquiring module, a sixth acquiring module, an encrypting module, a second decrypting module and a sending module;

the receiving module is configured to receive an instruction sent from a host;

the first determining module is configured to determine a type of the instruction received by the receiving module;

the first judging module is configured to judge whether a secure channel is established if the first determining module determines that the type of the instruction is a secure channel establishing instruction;

the sending module is configured to send information that secure channel is established successfully to the host if the first judging module judges that the secure channel is established;

the first acquiring module is configured to acquire a card parameter of a card if the first judging module judges that the secure channel is not established;

the second determining module is configured to determine an objective identifier according to the card parameter acquired by the first acquire module;

the second acquiring module is configured to acquire a function package corresponding to the objective identification determined by the second determining module;

the third acquiring module is configured to acquire original card data;

the first obtaining module is configured to obtain a derived key according to a preset second parameter package, the original card data obtained by the third acquiring module and the function package acquired by the second acquiring module;

the fourth acquiring module is configured to acquire a cipher text of random data from the card;

the first decrypting module is configured to obtain card random data by decrypting the cipher text of random data acquired by the fourth acquiring module according to the derived key acquired by the first obtaining module;

the generating module is configured to generate random data package;

the second obtaining module is configured to obtain a mapping data package according to the card random data obtained by the first decrypting module, the random data package generated by the generating module, a preset first parameter package and the function package acquired by the second acquiring module;

the updating module is configured to update the first parameter package according to the mapping data package obtained by the second obtaining module;

the third obtaining module is configured to obtain a session key package according to the random data package, the first parameter package updated by the updating module and the second parameter package;

the fourth obtaining module is configured to obtain a terminal authenticated token according to the session key package obtained by the third obtaining module and the function package acquired by the second acquiring module;

the reading module is configured to read a card authenticated token from the card according to the terminal authenticated token obtained by the fourth obtaining module;

the second judging module is configured to judge whether the secure channel is established successfully according to the terminal authenticated token read by the reading module and the card authenticated token obtained by the fourth obtaining module;

the identifying module is configured to identify that secure channel is established if a judging result of the second judging module is yes;

the fifth obtaining module is configured to obtain the secure session key according to the session key package obtained by the third obtaining module and store the secure session key if the judging result of the second judging module is yes;

the sending module is further configured to send information that establishing the secure channel is successful to the host if the fifth obtaining module obtains the secure session key and stores the secure session key;

the sending module is further configured to send information that establishing the secure channel is failed to the host if the judging result of the second judging module is no;

the third judging module is configured to judging whether the secure channel is established if the first determining module determines that the type of the instruction is a card communicating instruction;

the executing module is configured to execute a standard communication between the terminal and the card if the judging result of the third judging module is no;

the fifth obtaining module is configured to obtain card communication data from the card communicating instruction;

the sixth obtaining module is configured to obtain the secure session key stored;

the encrypting module is configured to use the secure session key to encrypt the card communication data to obtain cipher text of the card communicating data if the judging result of the third judging module is yes;

the sending module is further configured to send the cipher text of the card communicating data encrypted by the encrypting module to the card;

the second decrypting module is configured to use the secure session key acquired by the sixth acquiring module to decrypt a cipher text of a card communicating response sent from the card to obtain a card communicating response;

the sending module is further configured to return the card communicating response obtained by the second decrypting module back to the host; and the identifying module is further configured to identify that the secure channel is not established when detecting that the card leaves the terminal.

According to the present invention, there is provided a terminal for reading a card and a method for making operated a terminal for reading a card; in the claimed method, any communicating data between the card reading terminal and the card is transmitted in a cipher text via a secure channel, which can avoid that the communicating data to be intercepted, leaked or tampered and improves a security of communication; meanwhile, it is compatible to a standard card reading process, which has a good generality.

According to the present invention, the communicating data between the card reading terminal and the card is processed securely, which is hard to be intercepted, leaked and tampered, so that the security is improved greatly.

DESCRIPTION OF EMBODIMENTS

In order to make the purpose of this invention, technical solution and advantage more clearly, in conjunction with the attached drawings and implementation Examples, the present disclosure will be further described in detail below.

Embodiment 1

Figure 1:
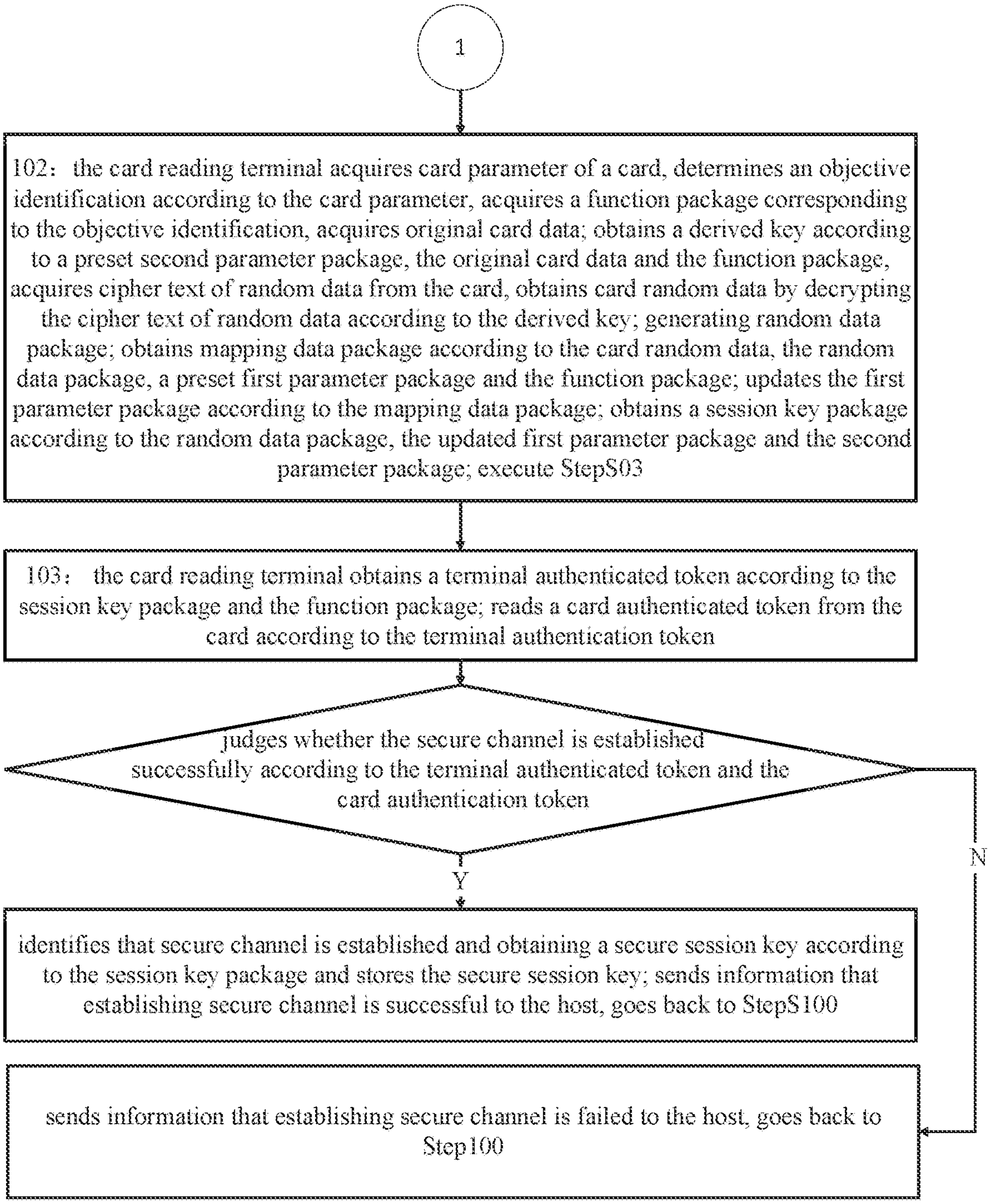
FIG. 1 is a flow chart for a working method of a card reading terminal of Embodiment 1 of the present invention.

Embodiment 1 provides a working method of a card reading terminal, as shown in FIG. 1, the method includes the following steps.

Step 100, when the card reading terminal receives an instruction sent from a host, the card reading terminal determines a type of an instruction, if the instruction is a secure channel establishing instruction, executes Step S101; while if the instruction is a card communicating instruction, executes Step S104.

Step 101, the card reading terminal determines whether a secure channel is established, if yes, sends information that secure channel is established successfully to the host, then goes back to Step S100; otherwise, executes Step S102.

Preferably, in Step 101, acquiring original card data specifically includes: the card reading terminal judges whether a first type of card data exists in the secure channel establishing instruction, if yes, determines the original card data according to the first type of card data, otherwise, receives the first type of card data input.

Preferably, in Step 101, acquiring the original card data specifically comprises: the card reading terminal acquires a second type of card data from the secure channel establishing instruction, and computes the second type of card data to obtain the original card data.

Step 102, the card reading terminal acquires a card parameter of a card, determines an objective identifier according to the card parameter, acquires a function package corresponding to the objective identifier, acquires the original card data; obtains a derived key according to a preset second parameter package, the original card data and the function package, acquires a cipher text of random data from the card, obtains card random data by decrypting the cipher text of random data according to the derived key; generates a random data package; obtains a mapping data package according to the card random data, the random data package, a preset first parameter package and the function package; updates the first parameter package according to the mapping data package; obtains a session key package according to the random data package, the updated first parameter package and the second parameter package; then executes Step S03;

Preferably, acquiring the original card data specifically comprises: the card reading terminal determines a type of original card data according to the secure channel establishing instruction, if the type is a first type, determines the original card data according to a first type of card data; while if the type is a second type, determines the original card data according to a second type of card data.

Further, that the card reading terminal determines the type of the original card data according to the secure channel establishing instruction specifically is: the card reading terminal determines the type of the original card data according to a preset byte in the secure channel establishing instruction, if the preset byte is a sixth preset datum, the type of the original card data is a first type; if the preset byte is a seventh preset datum, the type of the original card data is a second type.

Further, determining the original card data according to the first type card data specifically is: the card reading terminal receives the first type card data input, codes the first type card data to obtain the original card data.

Further, receiving the first type card data input specifically includes: the card reading terminal prompts inputting the first type card data, then receives and displays the first type card data synchronously.

Further, determining the original card data according to the first type card data specifically is: the card reading terminal receives the first type card data from the secure channel establishing instruction, and if the first type card data can be acquired from the secure channel establishing instruction, records the first type card data as the original card data.

Further, the method further includes: if the first type card data cannot be acquired from the secure channel instruction, the card reading terminal receives the first type card data input, codes the first type card data to obtain the original card data.

Further receiving the first type card data input includes: the card reading terminal prompts inputting the first type card data, receives and displays the first type card data synchronously.

Further, acquiring the original card data specifically includes: the card reading terminal acquires the second type card data from the secure channel establishing instruction, and computes the second type card data to obtain the original card data.

Preferably, acquiring the original card data specifically includes: the card reading terminal receives the first type card data input, and codes the first type card data to obtain the original card data.

Further, receiving the first type card data input specifically is: the card reading terminal prompts inputting the first type card data, receives and displays the first type card data input synchronously.

Preferably, Step 102 further includes: the card reading terminal sends a document selecting instruction to the card, determines a type of a document selecting response, if the type is a correct response, executes acquiring card parameter; while if the type is an error response, reports an error to the host, and waits for receiving a new instruction sent from the host, then goes back to Step 100.

Preferably, in Step 102, determining an objective identifier according to the card parameter specifically includes: the card reading terminal sends a parameter acquiring instruction to the card, acquires card objective identifier zone data from a parameter acquiring response returned from the card, acquires a preset terminal objective identifier list; determines an objective identifier according to the card objective identifier zone data and the terminal objective identifier list, acquires a function package corresponding to the determined objective identifier.

Further, determining an objective identifier according to the card objective identifier zone data and the terminal objective identifier list, acquiring a function package corresponding to the determined objective identifier specifically is: the card reading terminal determines an objective identifier list according to the card object identifier zone data and the terminal objective identifier list, selects an objective identifier, and acquires a function package corresponding to the selected objective identifier.

Preferably, in Step 102, before acquiring the original card data, the method further comprises: the card reading terminal sends an objective identifier instruction including an objective identifier to the card; and when receiving an objective identifier response, executes acquiring the original card data.

Step 103, the card reading terminal obtains a terminal authenticated token according to the session key package and the function package; reads a card authenticated token from the card according to the terminal authenticated token, judges whether the secure channel is established successfully according to the terminal authenticated token and the card authenticated token, if yes, identifies that the secure channel is established and obtains a secure session key according to the session key package and stores the secure session key; sends information that establishing the secure channel is successful to the host, then goes back to Step S100; otherwise, sends information that establishing the secure channel is failed to the host, then goes back to Step 100.

Preferably, in Step 103, reading the card authenticated token from the card according to the terminal authenticated token specifically is: the card reading terminal organizes an authenticated token exchanging instruction, sends the authenticated token exchanging instruction to the card; and when receiving an authenticated token exchanging response returned from the card, obtains the card authenticated token from the authenticated token exchanging response.

Preferably, in Step 103, determining whether the secure channel is established successfully according to the card authenticated token and the terminal authenticated token specifically is: the card reading terminal determines whether the card authenticated token and the terminal authenticated token are identical, if yes, the secure channel is established successfully; otherwise, the secure channel is established unsuccessfully.

Step 104, the card reading terminal determines whether the secure channel is established, if yes, goes to Step 105, otherwise executes a standard communication between the terminal and the card, then goes back to Step 100.

Step 105, the card reading terminal acquires card communicating data from the card communicating instruction; acquires the stored secure session key; uses the secure session key to encrypt the card communicating data to obtain cipher text of the card communicating data, sends the cipher text of the card communicating data to the card; uses the secure session key to decrypt a cipher text of card communicating response sent from the card to obtain a card communicating response, and returns the card communicating response to the host, then goes back to Step 100.

In Embodiment 1, the working method further includes: when detecting that the card leaves the terminal, the card reading terminal identifies that the secure channel is not established.

Preferably, in Embodiment 1, Step 102 includes the following steps.

Step M01, the card reading terminal sends a parameter acquiring instruction; determines an objective identifier according to a parameter acquiring response returned by the card, acquires a function package corresponding to the objective identifier; and acquires the original card data.

Step M02, the card reading terminal obtains a derived key according to a preset second parameter package, the original card data and the function package; reads a cipher text of random data from the card; and uses the derived key to decrypt the cipher text of random data so as to obtain the card random data.

Furthermore, in Step M02, that the card reading terminal obtains the derived key according to the preset second parameter package, the original card data and the function package specifically is: the card reading terminal takes the first preset parameter and the original card data as parameters to invoke a key derivation function in the function package to obtain the derived key.

Furthermore, in Step M02, reading the cipher text of the random data from the card specifically is: the card reading terminal sends a random number exchanging instruction to the card; and when receiving a random number exchanging response returned from the card, acquires the cipher text of random data form the random exchanging response.

Step M03, the card reading terminal generates the first random data in the random data package; obtains a first terminal public key according to the first random data, a preset first parameter package and the function package; reads a first card public key from the card according to the first terminal public key; obtains a first mapping data package according to the first card public key, the first random data, the card random data, the first parameter package and the function package, and updates the first parameter package according to the first mapping data package.

Furthermore, in Step M03, obtaining the first terminal public key according to the first random data, the preset first parameter package and the function package specifically is: the card reading terminal takes the first random data, the preset first parameter package as parameters to invoke a key generating function in the function package so as to obtain the first terminal public key.

Furthermore, in Step M03, reading the first card public key from the card according to the first terminal public key specifically is: the card reading terminal organizes the first public key exchanging instruction according to the first terminal public key; sends the first public key exchanging instruction to the card; and when receiving a first public key exchanging response returned from the card, acquires the first card public key from the first public key exchanging response.

Furthermore, in Step M03, obtaining the first mapping data package according to the first card public key, the first random data, the card random data, the first parameter package and the function package specifically is: the card reading terminal obtains a first shared key according to the first card public key, the first random data, the first parameter package and the function package to obtain the first shared key; and obtains the first mapping data package according to the card random data, the first random data, the first shared key and the function package.

Furthermore, that the card reading terminal obtains the first shared key according to the first card public key, the first random data, the first parameter package and the function package to obtain the first shared key specifically is: the card reading terminal takes the first card public key, the first random data and the first parameter package as parameters to invoke the key negotiating function in the function package so as to obtain the first shared key.

Furthermore, obtaining the first mapping data package according to the card random data, the first random data, the first shared key and the function package specifically is: the card reading terminal takes the card random data, the first random data, the first shared key and the function package as parameters to invoke the mapping function in the function package so as to obtain the first mapping data package.

Furthermore, the mapping function is a universal mapping function or an authentication mapping function.

Furthermore, Step M03 is substituted by: the card reading terminal generates a first random data in the random data package, obtains a second mapping data package according to the first random data, the card random data, the preset first parameter package and the function package; and updates the first parameter package according to the second mapping data package.

Furthermore, obtaining the second mapping data package according to the first random data, the card random data, the preset first parameter package and the function package; and updating the first parameter package according to the second mapping data package specifically is: the card reading terminal takes the card random data and the first random data as parameters to invoke a pseudorandom function to obtain pseudorandom data; takes the pseudorandom data and the preset first parameter package as parameters to invoke the mapping function in the function package to obtain the second mapping data package; updates the first parameter package according to the second mapping data package; and the mapping function is a composite mapping function.

Furthermore, Step M03 specifically includes: the card reading terminal organizes a random data transferring instruction according to the first random data, sends the random data transferring instruction to the card; when receiving a random data transferring response, obtains a second mapping data package according to the first random data, the card random data, the preset first parameter package and the function package; and updates the first parameter package according to the second mapping data package.

Step M04, the card reading terminal generates second random data in the random data package; obtains a second terminal public key according to the second random data, the updated first parameter package and the function package; reads a second card public key from the card according to the second terminal public key; and obtains a second shared key according to the second card public key, the second random data, the updated first parameter package and the function package.

Furthermore, in Step M04, obtaining the second terminal public key according to the second random data, the updated first parameter package and the function package specifically is: the card reading terminal takes the second random data and the updated first parameter as parameters to invoke the key generating function in the function package so as to obtain the second terminal public key.

Further, in Step M04, reading the second card public key from the card according to the second terminal public key specifically is: the card reading terminal organizes a second public key exchanging instruction according to the second terminal public key, sends the second public key exchanging instruction to the card; and when receiving a second public key exchanging response returned from the card, obtains the second card public key from the second public key exchanging response.

Furthermore, in Step M04, obtaining the second shared key according to the second card public key, the second random data, the updated first parameter package and the function package specifically is: the card reading terminal takes the second card public key, the second random data and the updated first parameter package as parameters to invoke the key negotiating function in the function package to obtain the second shared key.

Step M05: the card reading terminal obtains a session key package according to the second parameter package, the second shared key and the function package.

Furthermore, Step M05 specifically is: the card reading terminal takes a preset second parameter in the second parameter package and the second shared key as parameters to invoke a key derivation function in the function package to obtain a first session key in the session key package; takes a third parameter preset in the second parameter package and the second shared key as parameters to invoke a key derivation function in the function package so as to obtain the second session key in the session key package.

Furthermore, in Step 103, obtaining a terminal authenticated token according to the session key package and the function package specifically is: the card reading terminal invokes a token function in the function package according to the first session key in the session key package to obtain the terminal authenticated token.

Furthermore, in Step 103, obtaining the secure session key according to the session key package and storing the secure session key specifically is: the card reading terminal takes the second session key in the session key package as a secure session key and stores the secure session key.

Embodiment 2

Figure 2:
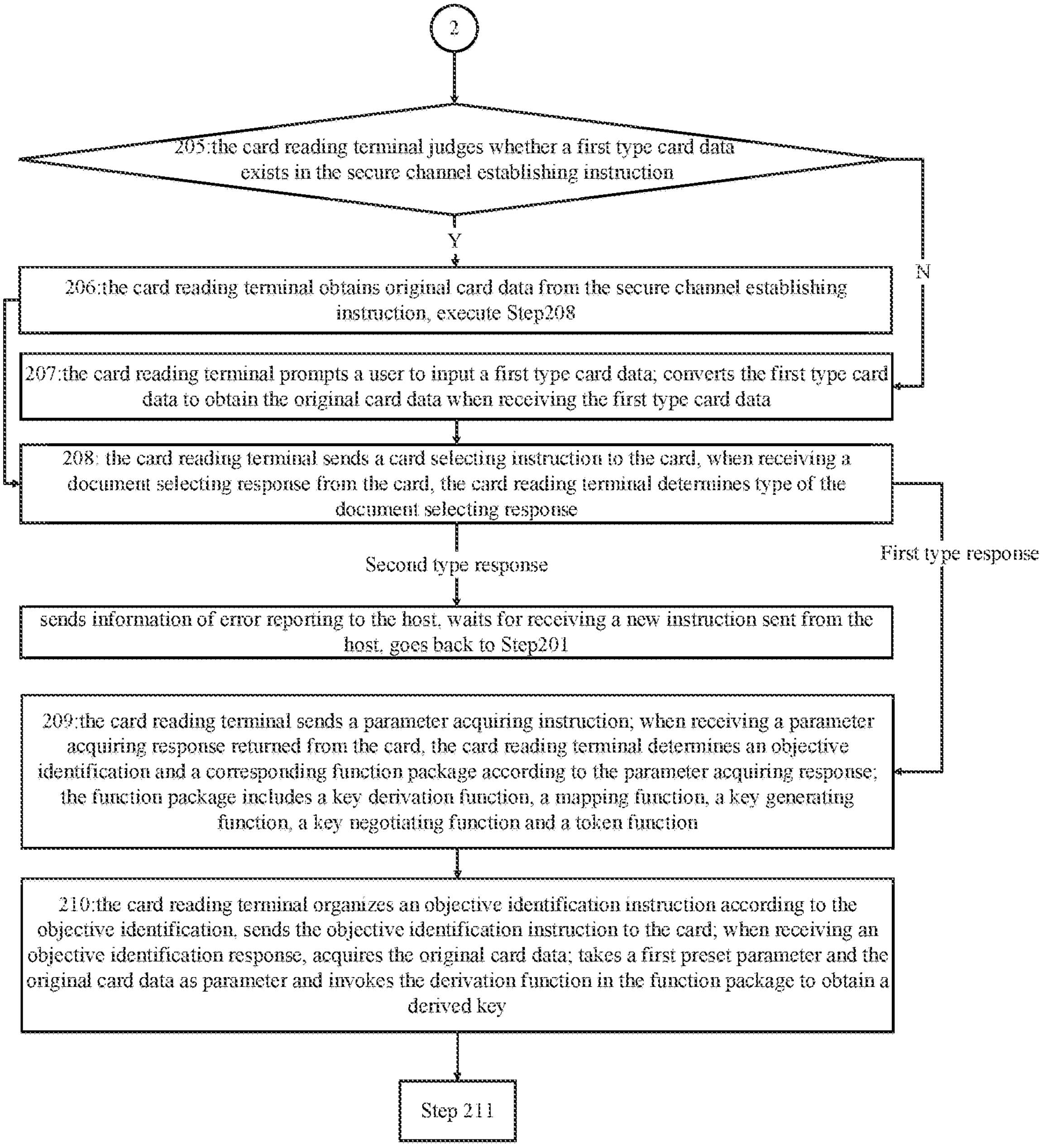
FIG. 2 and FIG. 3 are flow charts for a working method of a card reading terminal of Embodiment 2 of the present invention.
Figure 3:
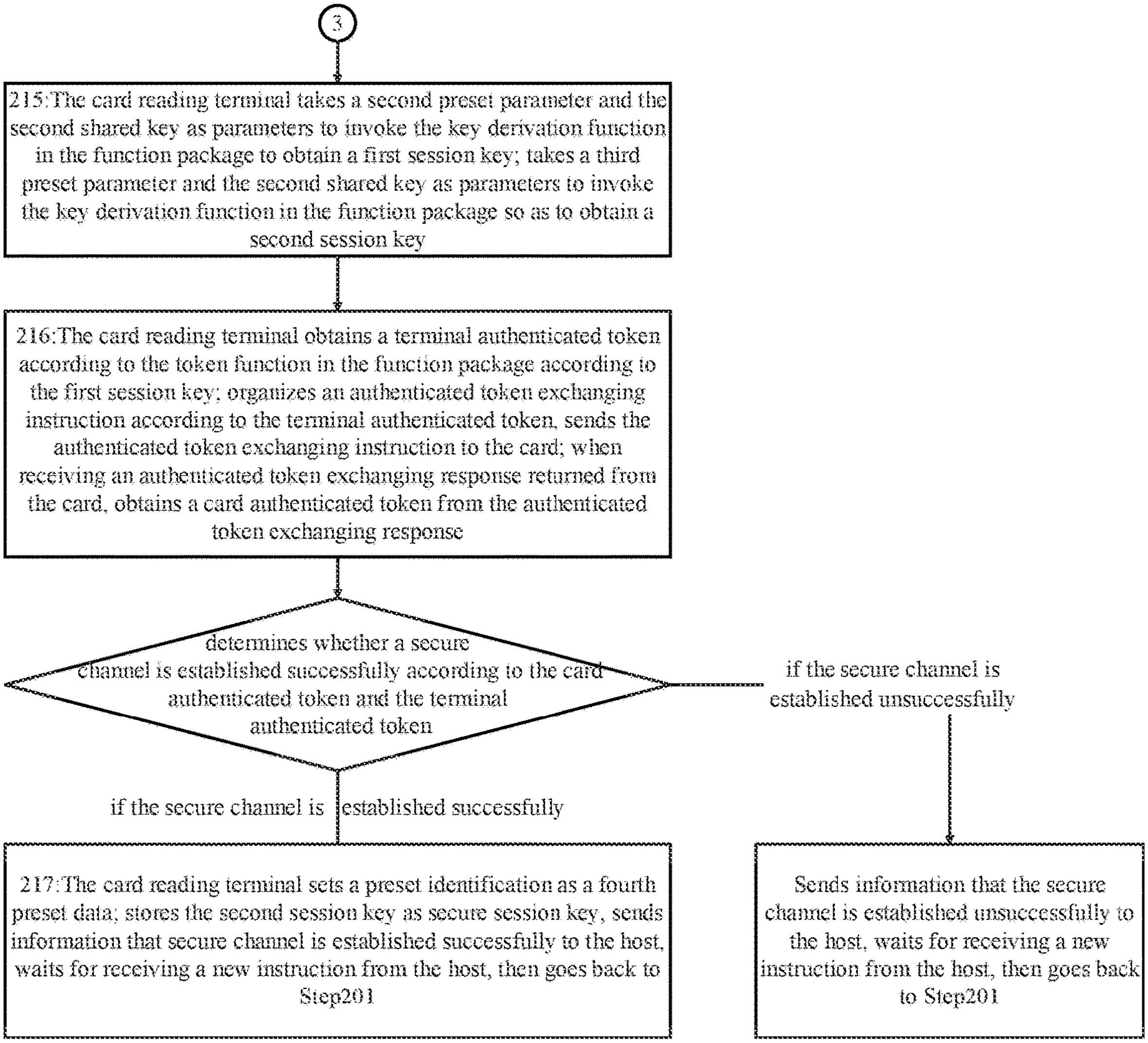

Embodiment 2 provides a working method of a card reading terminal; as shown in FIG. 2 and FIG. 3, the method includes the following steps.

Step 201, when receiving an instruction sent from a host, the card reading terminal determines a type of the instruction, if the instruction is a secure channel establishing instruction, then executes Step 202; while if the instruction is a card communicating instruction, then executes Step 218.

Preferably, Step 201 specifically is: when receiving the instruction sent from the host, the card reading terminal obtains data from the first byte to the fourth byte and the sixth byte in the instruction, determines the type of the instruction according to the data from the first byte to the fourth byte and the sixth byte, if the data from the first byte to the fourth byte is the first preset data and data of the sixth byte is the second preset data, the instruction is a secure channel establishing instruction, executes Step 202, otherwise the instruction is a card communicating instruction, executes Step 218.

For example, when receiving an instruction, i.e. 0xFFC201200C0209000200063031303632 34, sent from the host, the card reading terminal obtains data from the first byte to the fourth byte and the sixth byte in the instruction, determines the type of the instruction according to the data from the first byte to the fourth byte and the sixth byte, if the data from the first byte to the fourth byte is the first preset data, i.e. 0xFFC20120, and data of the sixth byte is the second preset data i.e. 0x02, the instruction is the secure channel establishing instruction, executes Step 202, otherwise the instruction is the card communicating instruction, executes Step 218.

Step 202, the card reading terminal judges whether a secure channel is established according to a preset identifier, if yes, sends a successful establishing response to the host and waits for receiving a new instruction, goes back to Step 201; otherwise, executes Step 203.

In Embodiment 2, the card reading terminal presets the preset identifier, which is for identifying whether the secure channel is established.

Preferably, Step 202 specifically is: the card reading terminal determines a type of the preset identifier, if the preset identifier is the fourth preset data which means that the secure channel is established, the card reading terminal sends a successful establishing response to the host, waits for receiving a new instruction sent from the host, goes back to Step 201; if the preset identifier is the fifth preset data which means that the secure channel is not established, executes Step 203.

For example, the card reading terminal determines a type of the preset identifier, if the preset identifier is the fourth preset data 0x01 which means that the secure channel is established, the card reading terminal sends the successful establishing response to the host, waits for receiving a new instruction sent from the host; if the preset identifier is the fifth preset data 0x00 which means that the secure channel is not established, then executes Step 203.

Preferably, Step 202 specifically is: the card reading terminal judges whether the preset identifier is equal to a the fourth preset data, if yes, it means that the secure channel is established, the card reading terminal sends a successful establishing response to the host, waits for receiving a new instruction sent from the host, goes back to Step 201; while if no, it means that the secure channel is not established, executes Step 203.

Preferably, Step 202 specifically is: the card reading terminal judges whether a preset identifier is set, if yes, it means that the secure channel is established, the card reading terminal sends a successful establishing response to the host, waits for receiving a new instruction sent from the host, goes back to Step 201; while if no, it means that the secure channel is not established, executes Step 203.

Preferably, Step 202 specifically is: the card reading terminal judges whether data of the preset identifier are equal to the fifth preset data, if yes, it means that the secure channel is not established, executes Step 203; while if no, it means that the secure channel is established, the card reading terminal sends a successful establishing response to the host, waits for receiving a new instruction sent from the host, then goes back to Step 201.

Preferably, the working method in Embodiment 2 further includes: if the card reading terminal detects that the card left the terminal, the card reading terminal sets the data of the preset identifier to be the fifth preset data.

Step 203, the card reading terminal determines a type of the original card data according to the secure channel instruction establishing instruction, if the type is a first type, executes Step 205; while if the type is a second type, executes Step 204.

In Embodiment 2, if the type of the original card data is the first type, in the following step, the original card data is obtained according to the first type of the card data, if the type of the original card data is the second type, in the following step, the original card data is obtained according to the second type card data; the first type of the card data printed or marked on the card when the card leaves a factory is used as an original factor subsequently for attending a process of establishing the secure channel between the card reading terminal and the card; the second type of the card data printed or marked on the card, for example, is an identity card which can be read by the card reading terminal, when the card leaves the factory, the second type of the card data is used as an original factor subsequently for attending a process of establishing the secure channel between the card reading terminal and the card.

Preferably, Step 203 specifically is: the card reading terminal acquires sixth byte data preset from the secure channel establishing instruction, judges a type of the six byte data, if the type is sixth data, the original card data is the first type, executes Stepe205; while if the type is seventh data preset, the original card data is the second type, executes Step 204.

Furthermore, Step 203 specifically is: the card reading terminal acquires a ninth byte of data in the secure channel establishing instruction and takes the acquired ninth byte of data as the sixth byte data, judges a type of the sixth byte data, if the type is the sixth data preset, the original card data is the first type, executes Step 205; while if the type is the seventh data preset, the original card data is the second type, executes Step 204.

For example, the card reading terminal acquires a ninth byte of data in the secure channel establishing instruction and takes the acquired ninth byte of data as the sixth byte data preset, judges a type of the sixth byte data 0x02, if the type is the sixth preset data, the original card data is the first type, executes Step 205; while if the type is the seventh preset data 0x01, the original card data is the second type, execute Steps 204.

Step 204, the card reading terminal acquires a second type card data from the secure channel establishing instruction, computes the second type card data to obtain the original card data; and executes Step 208.

For example, in Step 204 of the present Embodiment 2, if the secure channel establishing instruction is 0xFFC2012060025D0001005A493C55544F44323331343-5383930373C3C3C3C3C3 C3C3C3C3C3C3C3C3C3C373430383132324631323034 3-1353955544F3C3C3C3C3C3C3C3C 3C3C364552494B53534F4E3C3C414E4E413C4D415249-413C3C3C3C3C3C3C3C3C3C, the second type card data is: I<UTOD231458907<<<<<<<<<<<<<<<7408122F1 204159UTO <<<<<<<<<<<6ERIKSSON <<ANNA<MARIA <<<<<<<<<< of which the example data in hexadecimal is: 0x493C55544F44323331343538393037 3C3C3 C3C3C3C3C3C3C3C3C3C3C3C3C37343038313232-46313230343135395544F3C3C3C3C3C3C 3C3C3C3C3C364552494B53534F4E3C3C414E4E41-3C4D415249413C3C3C3C3C3C3C3C3C3C.

Preferably, Step 204 specifically is: the card reading terminal acquires the second type card data from the secure channel establishing instruction, performs sha-1 operation on the second type card data to obtain the original card data; then executes Step 208.

Preferably, the second type card data can be formed by a sequence number, a birth date and an expiration date.

Step 205, the card reading terminal judges whether the first type card data exists in the secure channel establishing instruction, if yes, executes Step 206; while if no, executes Step 207.

Preferably, before Step 205, the method further includes: the card reading terminal powers up, performs initializing; executes card inquiring operating; sends ART data to the host; connects the card when receiving a card connecting instruction sent from the host, and sends a successful connecting response to the host.

Further, before Step 205, the method further includes: the card reading terminal communicates with the host via a USB interface.

Further, before Step 205, the method further includes: the card reading terminal communicates with the host via a Bluetooth.

Preferably, Step 205 specifically is: the card reading terminal acquires third byte data preset from the secure channel establishing instruction, judges whether the original card data exists in the secure channel establishing instruction according to the third byte data and the third data preset, if yes, executes Step 206; while if no, executes Step 207.

Further, Step 205 specifically is: the card reading terminal acquires the third byte data preset from the secure channel establishing instruction, judges whether the third byte data preset are equal to the third preset data, if yes, it means that the first type card data exists in the secure channel establishing instruction, executes Step 206; while if no, it means that the first type card data does not exist in the secure channel establishing instruction, executes Step 207.

Further, Step 205 specifically is: the card reading terminal acquires data of the fifth byte of the secure channel establishing instruction and takes the data of the fifth byte of the secure channel establishing instruction as the third byte data preset, judges whether the third byte data preset are equal to the third preset data, if yes, it means that the first type card data exists in the secure channel establishing instruction, executes Step 206; while if no, it means that the first type card data does not exist in the secure channel establishing instruction, executes Step 207.

For example, the card reading terminal acquires data of the fifth byte of the secure channel establishing instruction and takes the data of the fifth byte of the secure channel establishing instruction as the third preset byte data, judges whether the third byte data preset are equal to the third preset data 0x0C, if yes, it means that the first type card data exist in the secure channel establishing instruction, executes Step 206; while if no, it means that the first type card data do not exist in the secure channel establishing instruction, executes Step 207.

Step 206, the card reading terminal obtains the original card data from the secure channel establishing instruction, then executes Step 208.

Preferably, Step 206 specifically is: the card reading terminal acquires the last six bytes of data of the secure channel establishing instruction and takes the last six bytes of data of the secure channel establishing instruction as the original card data; then executes Step 207.

For example, the card reading terminal acquires the last six bytes of data, i.e. 0x303130363234 of the secure channel establishing instruction 0xFFC201200C020900020006303130363234 and takes 0x303130363234 as the original card data; then executes Step 207.

Preferably, Step 206 further includes: the card reading terminal stores the original card data.

Step 207, the card reading terminal prompts a user to input first type card data; converts the first type card data to obtain the original card data when receiving the first type card data, then executes Step 208.

For example, the secure channel establishing instruction is 0xFFC2012006020300020000, then Step 208 is executed.

Preferably, Step 207 specifically is: the card reading terminal prompts the user to input the first type card data via the card reading terminal; converts the decimal first type card data into hexadecimal data to obtain the original card data when receiving the first type card data input, then executes Step 208.

In Embodiment 2, the card reading terminal has a function of inputting, which includes many inputting ways, for example, a voice input, a keyboard input, an input by scanning two dimension code, and an input by scanning a number marked on the card, etc.

For example, the card reading terminal prompts the user to input the first type card data 010624 via the card reading terminal; when receiving the type card data 010624 input, the card reading terminal converts the decimal first type card data 010624 into hexadecimal data to obtain the original card data 0x303130363234, then executes Step 208.

Preferably, Step 207 further includes: the card reading terminal displays the first type card data input; in this case, when the user inputs the data via the keyboard, the input data will be displayed via a display screen, which is easy for the user to check and amend the first type card data input. For example, the card reading terminal displays the input first type card data 010624.

Preferably, Step 207 further includes: when the card reading terminal does not receive the original card data, the card reading terminal reports an error to the host.

Preferably, Step 207 further includes: the card reading terminal stores the original card data. Step 208, the card reading terminal sends a card selecting instruction to the card, when receiving a document selecting response from the card, the card reading terminal determines a type of the document selecting response, if the type is a first type response, executes Step 209; while if the type is a second type response, sends reports an error to the host, waits for receiving a new instruction sent from the host, then goes back to Step 201.

Preferably, Step 208 specifically is: the card reading terminal sends the document selecting instruction to the card, when receiving the document selecting response from the card, the card reading terminal judges the type of the document selecting response, if the type is a correct response, executes Step 209; while if the type is an error response, reports an error to the host, waits for receiving a new instruction sent from the host, then goes back to Step 201.

For example, the card reading terminal sends a document selecting instruction 0x00A4020C02011C to the card, when receiving the document selecting response from the card, the card reading terminal judges a type of the document selecting response, if the type is a correct response 0x9000, executes Step 209; while if the type is an error response 0x00, sends reports an error to the host, and waits for receiving a new instruction sent from the host, then goes back to Step 201.

Step 209, the card reading terminal sends a parameter acquiring instruction; when receiving a parameter acquiring response returned from the card, the card reading terminal determines an objective identifier and a corresponding function package according to the parameter acquiring response; the function package includes a key derivation function, a mapping function, a key generating function, a key negotiating function and a token function.

Preferably, Step 209 specifically is: the card reading terminal sends the parameter acquiring instruction; when receiving the parameter acquiring response returned from the card, acquires card objective identifier zone data from the parameter acquiring response, acquires a preset terminal objective identifier list; determines an objective identifier according to the card objective identifier zone data and the terminal objective identifier list, acquires a function package corresponding to the determined objective identifier; the function package includes the key derivation function, the mapping function, the key generating function, the key negotiating function and the token function.

Preferably, Step 209 specifically is: the card reading terminal sends the parameter acquiring instruction; when receiving the parameter acquiring response returned from the card, acquire card objective identifier zone data from the parameter acquiring response, acquires the preset terminal objective identifier list; determines an objective identifier list according to the card objective identifier zone data and the terminal objective identifier list, selects an objective identifier from the objective identifier list, acquires the function package corresponding to the selected objective identifier; the function package includes the key derivation function, the mapping function, the key generating function, the key negotiating function and the token function.

In Step 209, when the mapping function is the second function type, the function package further includes a pseudorandom function.

In Step 209, in case that an objective identifier list is determined according to the card objective identifier zone data and the terminal objective identifier list, the common part of the card objective identifier zone data and the terminal objective identifier list construct the objective identifier list.

For example, in Step 209, the mapping function is the first function type, i.e. a universal function, the card reading terminal sends a parameter acquiring instruction 0x00B0000000 to the card; when receiving a parameter acquiring response, i.e. 0x3170300D0608 04007F000702010201 0101300F060A0400 7F0007020103020102010130120 60A04007F00070201040

20102010201010D 3012060A04007F0007020104020102010201010D301206 0A04007F000702010401020101020101 003012060A04007F0007020104010102010201010 09000, returned from the card, the card reading terminal acquires card objective identification zone data from the parameter acquiring response, acquires a preset terminal objective identifier list; determines an objective identifier list according to the card objective identifier zone data and the terminal objective identifier list, selects an objective identifier from the objective identifier list, acquires a function package corresponding to the selected objective identifier; the function package includes a key derivation function, a mapping function, a key generating function, a key negotiating function and a token function.

Step 210, the card reading terminal organizes an objective identifier instruction according to the objective identifier, sends the objective identifier instruction to the card; when receiving an objective identifier response, acquires the original card data; takes a first parameter preset and the original card data as the parameter and invokes the derivation function in the function package to obtain a derived key.

For example, the card reading terminal organizes an objective identifier instruction 0x0022C1A412800A04007F00070201040 20183010284010D according to the objective identifier, sends the objective identifier instruction 0x0022C1A412800A04007F000702010 4020183 010284010D to the card; when receiving an objective identification response 0x9000, acquires the original card data 0x303130363234; takes a first parameter preset and the original card data 0x303130363234 as the parameter and invokes the derivation function SHA-1 in the function package to obtain a derived key.

Preferably, Step 210 specifically is: the card reading terminal organizes the objective identifier instruction according to the objective identifier, sends the objective identifier instruction to the card; when receiving the objective identifier response, acquires the original card data; processes the original card data to obtain card processing data; takes the first parameter preset and the original card data as the parameter and invokes the derivation function in the function package to obtain the derived key.

Further, the card reading terminal organizes the objective identification instruction according to the objective identifier, sends the objective identifier instruction to the card; when receiving the objective identifier response, acquires the original card data; codes the original card data to obtain card processing data; takes the first parameter preset and the original card data as the parameters and invokes the derivation function in the function package to obtain the derived key.

Step 211, the card reading terminal sends a random number exchanging instruction to the card; when receiving a random number exchanging response returned from the card, acquires a cipher text of random data from the random number exchanging response, uses the derived key to decrypt the cipher text of random data to obtain the card random data; generates first random data; checks a type of the mapping function in the function package, if the mapping function is a first mapping function, executes Step 212; while if the mapping function is a second mapping function, executes Step 213.

In Embodiment 2, the first mapping function is a universal mapping function or an authentication mapping function; while the second mapping function is a composite mapping function.

For example, in Embodiment 2, for example, the mapping function is the first mapping function, the card reading terminal sends a random number exchanging function 0x10860000027C00 to the card; when receiving a random number exchanging response 0x7C1280102E7 E0A0A6644E81F48 B5472D3DB36E139000 returned from the card, acquires a cipher text of random data from the random number exchanging response, uses the derived key to decrypt the cipher text of random data to obtain card random data; generates first random data 0x60BC0DBD4 0B045E711A42CF57CA A3F9434D308FC7D752FA7661545160EF33FA9; checks a type of the mapping function in the function package, if the mapping function is the first mapping function, executes Step 212; while if the mapping function is the second mapping function, executes Step 213.

Step 212, the card reading terminal takes the first random data and a preset first parameter package as parameters to invoke the key generating function in the function package to obtain a first terminal public key; organizes a first public key exchanging instruction according to the first terminal public key; sends the first public key exchanging instruction to the card; when receiving a first public key exchanging response returned from the card, obtains a first card public key from the first public key exchanging response; takes the first card public key, the first random data and the first parameter package as parameters to invoke the key negotiating function in the function package to obtain a first shared key; takes the card random data, the first random data and the first shared key as parameters to invoke the first mapping function to obtain a first mapping data package; and updates the first parameter package according to the first mapping data package; then executes Step 214.

In Embodiment 2, the first parameter package is formed by eleventh preset data, twelfth preset data, thirteenth preset data and fourteenth preset data; updating the first parameter package in a following step is updating the thirteenth preset data and the fourteenth preset data in the first parameter package.

For example, the card reading terminal takes the first random data and the first parameter package as parameters to invoke the key generating function in the function package to obtain the first terminal public key 0x6AE356BD23F037A0AAC863434D9E0A094021FD0C A0A3B5194C 45BE 9D9638815246C23032CC91182B1EC93EF87ED 94F02D2EC950F5FCA7A34760A3A065D 15C22B;

organizes a first public key exchanging instruction 0x10860000457C438141046AE356BD23F 037A0AAC863434 D9E0A094021FD0CA0A3B5194C4 5BE9D9638815246C23032CC91182B1E C93EF87ED94F02D2EC950F5FCA7A34760A3A06 5D15C22B according to the first terminal public key0x6AE356BD23F037A0AAC863434D9E0A0940 21FD0CA0A3B5194 C45BE9D96388 15246C23032CC91182B1EC93EF87ED94F02D2EC 950F5FCA7A34760A3A065D15C22B; and sends the first public key exchanging instruction to the card;

when receiving a first public key exchanging response 0x7C4382410484F4C7389E0FC7414 89C89B4012 D2638743727E596C309CAE27E06F2C1681D3F33E 97D8E5CAECFF68D6EEFC CDEB9FF58D17FD1BD04ED480DE887AE82700A 90AB9000 returned from the card, obtains a first card public key 0x84F4C7389E0FC741489C89B4012D2 638743727E596C309CAE27E06F2C 1681D3F33E97D8E5CAECFF68D6EEFCCDEB9FF 58D17FD1BD04ED480DE887AE82700A90 AB from the first public key exchanging response;

takes the first card public key, the first random data and the first parameter package as parameters to invoke the key negotiating function in the function package to obtain a first shared key 0x510FCB20F1ACB7E3B7573D2F4B69BF9E5D436 D16B9502210E7F1226A3525 DF2232D7 FABDOAD6EC2BOEF15F8713273136BED230DAC BDE106138352EE46E44E9E8; and takes the card random data, the first random data and the first shared key as parameters to invoke the first mapping function to obtain a first mapping data package 0xA749C5589BBE2E 82D6 9B18F6F5C6C4F78C5EB8524BE3167352351795FD 3D16B225BD7BE4B504B6C3E6697F F1EA52906FD2CAE3CE45DACCE6CE12DCF9735 20E22; and updates the first parameter package according to the first mapping data package; then executes Step 214.

Step 213, the card reading terminal organizes a random data transferring instruction according to the first random data, sends the random data transferring instruction to the card; when receiving a random data transferring response returned from the card, takes the card random data and the first random data as parameters to invoke the pseudorandom function in the function package to obtain pseudorandom data; takes the pseudorandom data and the first parameter package as parameters to invoke the second mapping function to obtain a second mapping data package; and updates the first parameter package according to the second mapping data package; then executes Step 214.

In Embodiment 2, the function package further includes the pseudorandom function.

Step 214, the card reading terminal generates second random data; takes the second random data and the updated first parameter package as parameters to invoke the key generating function in the function package to obtain a second terminal public key; organizes a second public key exchanging instruction according to the second terminal public key, and sends the second public key exchanging instruction to the card; when receiving a second public key exchanging response returned from the card, the card reading terminal obtains a second card public key from the second public key exchanging response; and takes the second card public key, the second random data and the updated first parameter package to invoke the key negotiating function in the function package to obtain a second shared key.

For example, the card reading terminal generates a second random data 0x3F0614AA70 D17AD5661641C5679370A31BFC354249D41E1268334B 59576A6CC6;

takes the second random data and the updated first parameter package as parameters to invoke the key generating function in the function package to obtain a second terminal public key 0x1COF 55127C7A66916E49C94E3BE653A718C290F49205 1178443ADEE98141AD2D95 DF34518573 CEC44312B65BA27FD731413B99E6FB7D39DB944 A88DA0DOB359D;

organizes a second public key exchanging instruction according to the second terminal public key, and sends the second public key exchanging instruction to the card;

when receiving a second public key exchanging response 0x7C438441041687E96D86940942 647F3FD7DC7 DECF2F762F3B3F1F45B523243FAB762D6A3979E BBFBD7FB37FBBCF25D 654DD2FBF1BF6333815B657F83E1C127153396BF C99A9000 returned from the card, the card reading terminal obtains a second card public key0x1687E96D86940942647F3FD7DC7DECF2F 762F3B3F1F45B523243FAB762D6A3979EBBFBD7 FB37FBBCF25D654DD2FBF1BF6333815 B65783E1C127153396BFC99A from the second public key exchanging response 0x7C43844104 1687E96D86940942647F3FD7DC7DECF2F762F3B3 F1F45B523243FAB762D6A3979EBBFBD7 FB37FBBCF25D654DD2FBF1BF6333815B657F83E 1C127153396BFC99A9000; and takes the second card public key, the second random data and the updated first parameter package to invoke the key negotiating function in the function package to obtain a second shared key 0x931D69E50F71F2EF84B527BA3F53 35A6740DF592227F56C2D944B96E81A1BBA30E 87C3A0788002650D1CD349E1E2D4C18C3B6E8C7 6316ACB27143E79FFC76D97.

Step 215, the card reading terminal takes a second preset parameter and the second shared key as parameters to invoke the key derivation function in the function package to obtain a first session key; and takes a third preset parameter and the second shared key as parameters to invoke the key derivation function in the function package so as to obtain a second session key.

Step 216, the card reading terminal obtains a terminal authenticated token according to the token function in the function package according to the first session key; organizes an authenticated token exchanging instruction according to the terminal authenticated token, and sends the authenticated token exchanging instruction to the card; when receiving an authenticated token exchanging response returned from the card, obtains a card authenticated token from the authenticated token exchanging response, and determines whether a secure channel is established successfully according to the card authenticated token and the terminal authenticated token, if the secure channel is established successfully, executes Step 217; while if the secure channel is established unsuccessfully, sends information that the secure channel is established unsuccessfully to the host, and waits for receiving a new instruction from the host, then goes back to Step 201.

Preferably, Step 216 specifically is: the card reading terminal takes the second preset parameter and the second shared key as parameters to invoke the key derivation function in the function package to obtain a first session key; takes the third preset parameter and the second shared key as parameters to invoke the key derivation function in the function package to obtain a second session key; invokes the token function in the function package according to the first session key to obtain the terminal authenticated token; invokes the token function in the function package according to the first session key to obtain the terminal authenticated token; organizes the authenticated token exchanging instruction according to the terminal authenticated token, and sends the authenticated token exchanging instruction to the card; when receiving an authenticated token exchanging response from the card, the card reading terminal obtains the card authenticated token from the authenticated token exchanging response, and judges whether the card authenticated token and the terminal authenticated token are identical, if yes, it means that the secure channel is established successfully, executes Step 217; otherwise, it means that the secure channel is established unsuccessfully, and waits for receiving a new instruction from the host, then goes back to Step 201.

For example, the card reading terminal takes the second preset parameter and the second shared key as parameters to invoke the key derivation function in the function package to obtain the first session key; takes the third preset parameter and the second shared key as parameters to invoke the key derivation function in the function package to obtain the second session key; invokes the token function in the function package according to the first session key to obtain the terminal authenticated token; invokes the token function in the function package according to the first session key to obtain the terminal authenticated token; organizes the authenticated token exchanging instruction 0x008600000C7C0A8508A18E3DA1A1B5398C according to the terminal authenticated token, and sends the authenticated token exchanging instruction to the card; when receiving an authenticated token exchanging response 0x7C0A86089CE08195081051E69000 from the card, the card reading terminal obtains the card authenticated token from the authenticated token exchanging response, and judges whether the card authenticated token and the terminal authenticated token are identical, if yes, it means that the secure channel is established successfully, executes Step 217; otherwise, it means that the secure channel is established unsuccessfully, and waits for receiving a new instruction from the host, then goes back to Step 201.

Step 217, the card reading terminal sets a preset identifier as a fourth preset data; stores the second session key as a secure session key, sends information that the secure channel is established successfully to the host, and waits for receiving a new instruction from the host, then goes back to Step 201;

For example, the card reading terminal sets the second session key as the secure session key, sends information that the secure channel is established successfully to the host, and waits for receiving a new instruction from the host, then goes back to Step 201.

Step 218, the card reading terminal judges whether the secure channel is established according to a preset identifier, if yes, executes Step 219; otherwise, executes Step 220.

Step 219, the card reading terminal obtains card communicating data from a card communicating instruction; obtains the stored secure session key, encrypts the card communicating data by using the secure session key to obtain a cipher text of the card communicating data, sends the card communicating data to the card; when receiving the cipher text of a card communicating response, decrypts the cipher text of the card communicating response by using the secure session key to obtain a card communicating response, sends the card communicating response to the host, and waits for receiving a new instruction sent from the host, then goes back to Step 201.

Step 220, the card reading terminal sends a card communicating instruction to the card, when receiving a card communicating response sent from the card, sends a card communicating response to the host, and waits for receiving a new instruction sent from the host, then goes back to Step 201.

Embodiment 3

Figure 4:
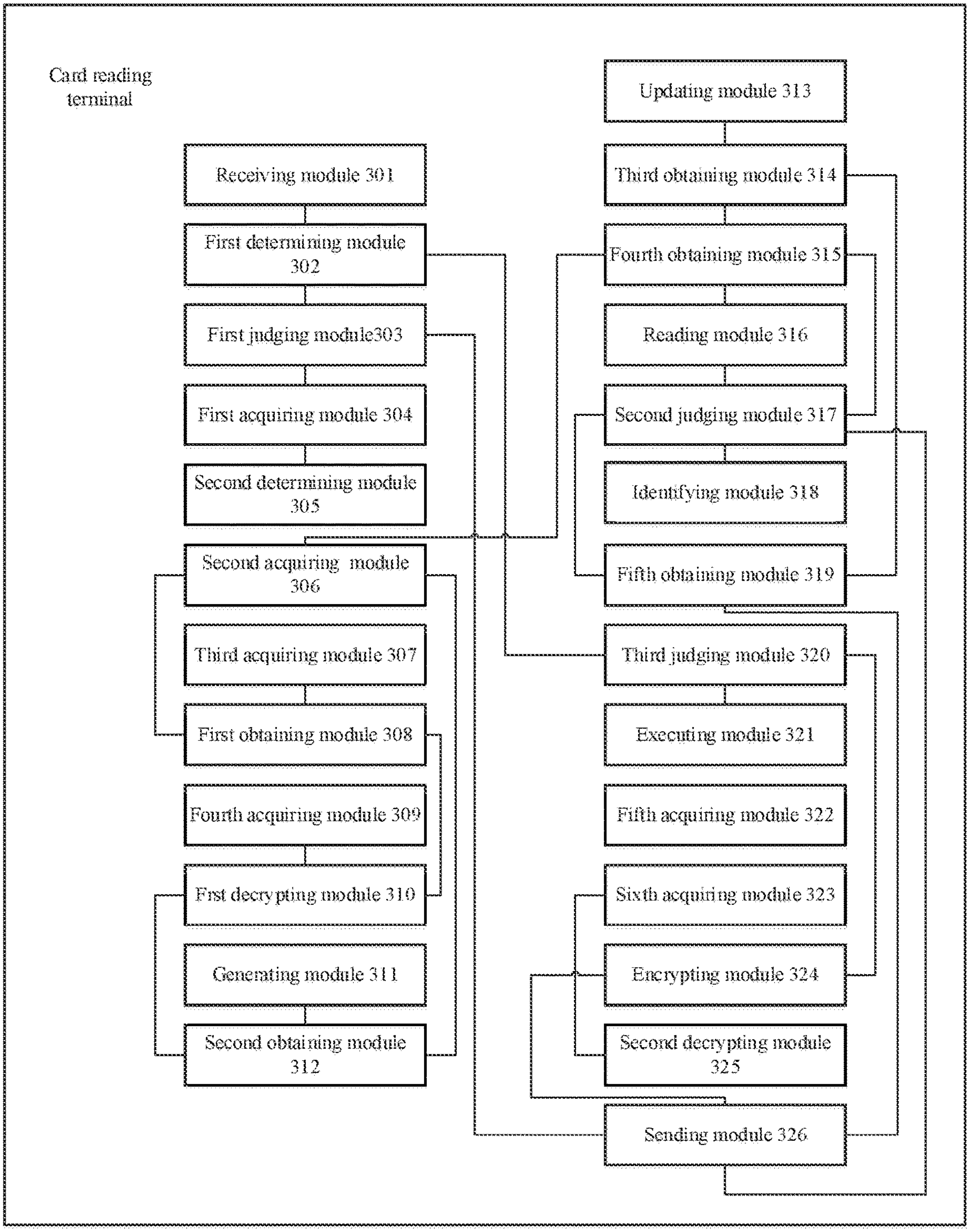
FIG. 4 is a block diagram of a card reading terminal of Embodiment 3 of the present invention.

Embodiment 3 provides a card reading terminal, as shown in FIG. 4, the card reading terminal includes: a receiving module 301, a first determining module 302, a first judging module 303, a first acquiring module 304, a second determining module 305, a second acquiring module 306, a third acquiring module 307, a first obtaining module 308, a fourth acquiring module 309, a first decrypting module 310, a generating module 311, a second obtaining module 312, an updating module 313, a third obtaining module 314, a fourth obtaining module 315, a reading module 316, a second judging module 317, an identifying module 318, a fifth obtaining module 319, a third judging module 320, an executing module 321, a fifth acquiring module 322, a sixth acquiring module 323, an encrypting module 324, a second decrypting module 325 and a sending module 326; in which

- the receiving module 301 is configured to receive an instruction sent from a host;
- the first determining module 302 is configured to determine a type of the instruction received by the receiving module 301;
- the first judging module 303 is configured to judge whether a secure channel is established if the first determining module 302 determines that the type of the instruction is a secure channel establishing instruction;
- the sending module 326 is configured to send information that the secure channel is established successfully to the host if the first judging module 303 judges that the secure channel is established;
- the first acquiring module 304 is configured to acquire a card parameter of a card if the first judging module 303 judges that the secure channel is not established; and
- the second determining module 305 is configured to determine an objective identifier according to the card parameter acquired by the first acquire module 304.

Preferably, the second determining module 305 specifically is configured to send a parameter acquiring instruction to the card, acquire card objective identifier zone data from a parameter acquiring response returned from the card, acquire a preset terminal objective identifier list; determine an objective identifier according to the card objective identifier zone data and the terminal objective identifier list, acquire a function package corresponding to the determined objective identifier.

Further, that the second determining module 305 is configured to determine an objective identifier according to the card objective identifier zone data and the terminal objective identifier list specifically is: the second determining module 305 is configured to determine the objective identifier list according to the card objective identifier zone data and the terminal objective identifier list, select the objective identifier from the objective identifier list, acquire a function package corresponding to the selected objective identifier.

The second acquiring module 306 is configured to acquire a function package corresponding to the objective identifier determined by the second determining module 305; and the third acquiring module 307 is configured to acquire original card data.

Preferably, the third acquiring module 307 is specifically configured to determine a type of the original card data according to the secure channel establishing instruction, if the type is a first type, determine the original card data according to a first type card data; while if the type is a second type, determine the original card data according to a second type card data.

That the third acquiring module 307 is configured to determine the type of the original card data according to the secure channel establishing instruction specifically is: the third acquiring module 307 is configured to determine the type of the original card data according to preset bytes in the secure channel establishing instruction, if the preset bytes are sixth preset data, the type of the original card data is a first type; while if the preset bytes are seventh preset data, the type of the original card data is a second type, Further, that the third acquiring module 307 is configured to determine the original card data according to the first type card data specifically is: the third acquiring module 307 is configured to receive the first type card data input, code the first type card data to obtain the original card data.

Further, that the third acquiring module 307 is configured to determine the original card data according to the first type card data specifically is: the third acquiring module 307 is configured to acquire the first type card data from the secure channel establishing instruction, and record the first type card data as the original card data if the first type card data can be acquired from the secure channel establishing instruction.

Further, that the third acquiring module 307 further is configured to receive the first type card data input, code the first type card data to obtain the original card data if the first type card data cannot be acquired from the secure channel establishing instruction.

Further, that the third acquiring module 307 is configured to determine the original card data according to the second type card data specifically is: the third acquiring module 307 is configured to acquire the second type card data from the secure channel establishing instruction, and compute the second type card data to obtain the original card data.

Preferably, the third acquiring module 307 is specifically configured to receive the first type card data input, and code the first type data to obtain the original card data.

Preferably, the third acquiring module 307 specifically is configured to judge whether the first type card data exists in the secure channel establishing instruction, if yes, determine the original card data according to the first type card data, otherwise, receiving the first type card data input.

Preferably, the third acquiring module 307 specifically is configured to acquire the second type card data from the secure channel establishing instruction, and compute the second type card data to obtain the original card data.

In the present embodiment 3, that the third acquiring module 307 is configured to receive a first type card data input specifically is: the third acquiring module 307 is configured to prompt inputting the first type card data, receive and display the first type card data input synchronously.

The first obtaining module 308 is configured to obtain a derived key according to a preset second parameter package, the original card data obtained by the third acquiring module 307 and the function package acquired by the second acquiring module 306.

The fourth acquiring module 309 is configured to acquire a cipher text of random data from the card.

The first decrypting module 310 is configured to obtain card random data by decrypting the cipher text of random data acquired by the fourth acquiring module 309 according to the derived key acquired by the first obtaining module 308.

The generating module 311 is configured to generate a random number data package.

The second obtaining module 312 is configured to obtain the mapping data package according to the card random data obtained by the first decrypting module 310, the random data package generated by the generating module 311, a preset first parameter package and the function package acquired by the second acquiring module 306.

The updating module 313 is configured to update the first parameter package according to the mapping data package obtained by the second obtaining module 312.

The third obtaining module 314 is configured to obtain a session key package according to the random data package, the first parameter package updated by the updating module 313 and the second parameter package.

The fourth obtaining module 315 is configured to obtain a terminal authenticated token according to the session key package obtained by the third obtaining module 314 and the function package acquired by the second acquiring module 306.

The reading module 316 is configured to read a card authenticated token from the card according to the terminal authenticated token obtained by the fourth obtaining module 315. The second judging module 317 is configured to judge whether the secure channel is established successfully according to the terminal authenticated token read by the reading module 316 and the card authenticated token obtained by the fourth obtaining module 315.

The identifying module 318 is configured to identify that the secure channel is established if a judging result of the second judging module 317 is yes.

The fifth obtaining module 319 is configured to obtain a secure session key according to the session key package obtained by the third obtaining module 314, and store the secure session key if the judging result of the second judging module 317 is yes.

The sending module 326 is further configured to send information that establishing the secure channel is successful to the host if the fifth obtaining module 319 obtains the secure session key and stores the secure session key.

The sending module 326 is further configured to send information that establishing the secure channel is failed to the host if the judging result of the second judging module 317 is no.

The third judging module 320 is configured to judging whether the secure channel is established if the first determining module 302 determines that a type of the instruction is card communicating instruction.

The executing module 321 is configured to execute a standard communication between the terminal and the card if the judging result of the third judging module is no, The fifth obtaining module 322 is configured to obtain card communication data from the card communicating instruction.

The sixth obtaining module 323 is configured to obtain the stored secure session key.

The encrypting module 324 is configured to use the secure session key to encrypt the card communicating data to obtain cipher text of the card communicating data if the judging result of the third judging module 320 is yes.

The sending module 326 is further configured to send the cipher text of the card communicating data encrypted by the encrypting module 324 to the card.

The second decrypting module 325 is configured to use the secure session key acquired by the sixth acquiring module 323 to decrypt a cipher text of a card communicating response sent from the card to obtain the card communicating response.

The sending module 326 is further configured to return the card communicating response obtained by decrypting performed by the second decrypting module 325 back to the host.

The identifying module 318 is further configured to identify that the secure channel is not established when detecting that the card leaves the terminal.

Preferably, the sending module 326 is further configured to send a document selecting instruction to the card.

Correspondingly, the fourth judging module is configured to judge a type of a document selecting response returned from the card.

Correspondingly, the first acquiring module 304 is specifically configured to acquire a card parameter if the fourth judging module judges that the type of the document selecting response returned from the card is a correct response.

Correspondingly, the sending module 326 is further configured to report an error to the host, wait for receiving a new instruction sent from the host if the fourth judging module judges that the type of the document selecting response returned from the card is an error response. Preferably, the third obtaining module 307 is further configured to send an objective identifier instruction comprising the objective identifier; when receiving an objective identifier response, acquire the acquired original card data.

Preferably, the sending module 326 is further configured to send a parameter acquiring instruction to the card.

Correspondingly, the first acquiring module 304 specifically is configured to acquire a parameter acquiring response returned from the card if the first judging module 303 judges that the secure channel is not established.

Correspondingly, the second determining module 305 specifically is configured to determine an objective identifier according to the parameter acquiring response returned from the card.

Correspondingly, the generating module 311 comprises a first generating unit and a second generating unit.

Correspondingly, the first generating unit is configured to generate first random data in a random data package.

Correspondingly, the second obtaining module 312 specifically is configured to obtain a first terminal public key according to the first random data generated by the first generating unit, a preset first parameter package and the function package acquired by the second acquiring module 306; read a first card public key from the card according to the first terminal public key; obtain a first mapping data package according to the first card public key, the first random data generated by the first generating unit, the card random data acquired by the fourth acquiring module 309, the first parameter package and the function package acquired by the second acquiring module 306. Correspondingly, the updating module 313 specifically is configured to update the first parameter package according to the first mapping data package acquired by the second obtaining module 312.

Correspondingly, the second generating unit is configured to generate second random data in the random data package.

Correspondingly, the third obtaining module 314 specifically is configured to obtain a second terminal public key according to the second random data acquired by the second generating unit, the first parameter package updated by the updating module 313 and the function package acquired by the second acquiring module 306; read a second card public key from the card according to the second terminal public key; obtain a second shared key according to the second card public key, the second random data generated by the second generating unit, the first parameter package updated by the updating module 313 and the function package acquired by the second acquiring module 306; and obtain a session key package according to the second parameter package, the second shared key and the function package acquired by the second acquiring module 306.

Further, the first obtaining module 308 specifically is configured to take a first preset parameter in a preset second parameter package and the original card data acquired by the third acquiring module 307 as parameters and invoke the derivation function in the function package acquired by the second acquiring module 306 to obtain a derived key.

Further, the fourth acquiring module 309 specifically is configured to send a random number exchanging instruction to the card; and when receiving a random number exchanging response returned from the card, to acquire a cipher text of random data from the random number exchanging response.

Further, that the second obtaining module 312 is configured to obtain the first terminal public key according to the first random data generated by the first generating unit, the preset first parameter package and the function package acquired by the second acquiring module 306 specifically is: the second obtaining module 312 is configured to take the first random data and the preset first parameter package as parameters to invoke the key generating function in the function package to obtain the first terminal public key.

Further, that the second obtaining module 312 is configured to read the first card public key from the card according to the first terminal public key specifically includes: the second obtaining module 312 organizes the first public key exchanging instruction according to the first terminal public key; send the first public key exchanging instruction to the card; when receiving the first public key exchanging response returned from the card, and acquire the first card public key from the first public key exchanging response.

Further, that the second obtaining module 312 is configured to obtain the first mapping data package according to the first card public key, the first random data generated by the first generating unit, the card random data acquired by the fourth acquiring module 309, the first parameter package and the function package acquired by the second acquiring module 306 specifically is: the second obtaining module 312 is configured to obtain a first shared key according to the first card public key, the first random data generated by the first generating unit, a first parameter and the function package acquired by the second acquiring module 306; and obtain the first mapping data package according to the card random data acquired by the fourth acquiring module 309, the first random data generated by the first generating unit, the first shared key and the function package acquired by the second acquiring module 306.

Further, that the second obtaining module 312 is configured to obtain the first shared key according to the first card public key, the first random data generated by the first generating unit, the first parameter and the function package acquired by the second acquiring module 306 specifically is: the second obtaining module 312 is configured to take the first card public key, the first random data generated by the first generating unit and the first parameter package as parameters to invoke the negotiating function in the function package acquired by the second acquiring module 306 to obtain the first shared key.

Further, that the second obtaining module 312 is configured to obtain the first mapping data package according to the first card public key, the first random data generated by the first generating unit, the first parameter package and the function package acquired by the second acquiring module 306 specifically is: the second obtaining module 312 is configured to take the card random data acquired by the fourth acquiring module 309, the first random data generated by the first generating unit and the first shared key as parameters to invoke the mapping function in the function package acquired by the second acquiring module 306 to obtain the first mapping data package; preferably, the mapping function is a universal mapping function or an authentication mapping function.

Further, the second acquiring module 312 further is configured to obtain the second mapping data package according to the first random data generated by the first generating unit, the card random data acquired by the fourth acquiring module 309, the preset first parameter package and the function package acquired by the second acquiring module 306.

Further and correspondingly, the updating module 313 is further configured to update the first parameter package according to the second mapping data package obtained by the second obtaining module 312.

Further, that the second acquiring module 312 is configured to obtain the second mapping data package according to the first random data generated by the first generating unit, the card random data acquired by the fourth acquiring module 309, the preset first parameter package and the function package acquired by the second acquiring module 306 specifically is: the second acquiring module 312 is configured to take the card random data acquired by the fourth acquiring module 309 and the first random data as parameters to invoke the pseudorandom function in the function package acquired by the second acquiring module to obtain pseudorandom data; take the pseudorandom data and the first parameter package as parameters to invoke the mapping function in the function package acquired by the second acquiring module 306 to obtain the second mapping data package; and the mapping function is a composite mapping function.

Further, the second acquiring module 312 is further configured to organize the random data transferring instruction according to the first random data generated by the first generating unit, send the random data transferring instruction to the card; and when receiving a random data transferring response returned from the card, take the card random data and the first random data as parameters to obtain the second mapping data package according to the first random data generated by the first generating unit, the card random data, the preset first parameter package and the function package acquired by the second acquiring module 306.

Further, in Step M04, obtaining the second terminal public key according to the second random data, the updated first parameter package and the function package specifically is: the card reading terminal 300 takes the second random data and the updated first parameter as parameters to invoke a key generating function in the function package so as to obtain the second terminal public key.

Further, that the third obtaining module 314 is configured to read the second card public key from the card according to the second terminal public key specifically is: the third obtaining module 314 is configured to organize a second public key exchanging instruction according to the second terminal public key, send the second public key exchanging instruction to the card; and when receiving a second public key exchanging response returned from the card, obtain a second card public key from the second public key exchanging response.

Further, that the third obtaining module 314 is configured to obtain the second shared key according to the second card public key, the second random data generated by the second generating unit, the first parameter package updated by the updating module 313 and the function package acquired by the second acquiring module 306 specifically is: the third obtaining module 314 is configured to take the second card public key, the second random data generated by the second generating unit and the first parameter package updated by the updating module 313 to invoke the key negotiating function in the function package acquired by the second acquiring module 306 to obtain the second shared key.

Further, that the third obtaining module 314 is configured to obtain the session key package according to the second parameter package, the second shared key and the function package acquired by the second acquiring module 306 specifically is: the third obtaining module 314 is configured to take the second preset parameter in the second parameter package and the second shared key as parameters to invoke the key derivation function in the function package acquired by the second acquiring module 306 to obtain the first session key in the session key package; take a third preset parameter in the second parameter package and the second shared key as parameters to invoke the key derivation function in the function package acquired by the second acquiring module 306 to obtain the second session key in the session key package.

Further, the fourth obtaining module 315 specifically is configured to invoke the token function in the function package acquired by the second acquiring module 303 according to the first session key in the session key package obtained by the third obtaining module 314 so as to obtain the terminal authenticated token.

Further, the fifth obtaining module 319 specifically is configured to take the second session key in the session key package obtained by the third obtaining module 314 as the secure session key and store the secure session key.

Preferably, the reading module 316 is specifically configured to organize an authenticated token exchanging instruction according to the terminal authenticated token obtained by the fourth obtaining module 315, send the authenticated token exchanging instruction to the card; and when receiving the authenticated token exchanging response returned from the card, obtain the card authenticated token from the authenticated token exchanging response.

Preferably, the second determining module 317 specifically is configured to determine whether the card authenticated token read by the reading module 316 and the terminal authenticated token acquired by the fourth acquiring module 315 are identical, if yes, it means that a secure channel is established successfully; otherwise, it means that the secure channel is established unsuccessfully.

The above descriptions are only preferred specific embodiments of the present application, but the scope of protection of the present application is not limited thereto. Any changes or substitutions that can be easily conceived by those skilled in the art within the technical scope disclosed in the present application should be included in the scope of protection of the present application. Therefore, the scope of protection of the present application should be subject to the appended claims.

The invention claimed is:

1. A method for operating a terminal for reading a card, wherein any communicating data between the terminal and the card is transmitted in a cipher text via a secure channel, so as to avoid the communicating data to be intercepted, leaked or tampered and improve a security of communication, said method comprising the following steps:

Step 0) determining, by the terminal, a type for an instruction sent from a host when the terminal receives the instruction, if the instruction is for establishing the secure channel, executing Step 1; while if the instruction is for card communicating, executing Step 4;

Step 1) judging, by the terminal, whether the secure channel is established, if yes, sending information that the secure channel is established successfully to the host, going to Step 0; otherwise, executing Step 2;

Step 2) acquiring, by the terminal, a card parameter, determining an objective identifier according to the card parameter, acquiring a data package comprising functions and corresponding to the objective identifier, acquiring original card data stored in the card; obtaining a derived key according to a second parameter package preset using a key derivation function, the original card data and the data package, acquiring a cipher text of random data from the card, obtaining card random data by decrypting the cipher text of random data according to the derived key; generating a random data package; obtaining a mapping data package according to the card random data, the random data package, a first parameter package preset and the data package; updating the first parameter package according to the mapping data package; and obtaining a session key package according to the random data package, the updated first parameter package and the second parameter package; then executing Step 3;

Step 3) obtaining, by the terminal, a terminal authenticated token according to the session key package and the data package; reading a card authenticated token from the card according to the terminal authenticated token, judging whether the terminal authenticated token and the card authenticated token are identical to each other, if yes, identifying that the secure channel is established and obtaining a secure session key according to the session key package and storing the secure session key; sending information that establishing the secure channel is successful to the host, then going to Step 0; otherwise, sending information that establishing the secure channel is failed to the host, then going to Step 0;

Step 4) judging, by the terminal, whether the secure channel is established, if yes, executing Step 5; otherwise, executing a standard communication between the terminal and the card, then going to Step 0; and Step 5) acquiring, by the terminal, card communicating data from the instruction for card communicating; acquiring the secure session key stored in Step 3; using the secure session key to encrypt the card communicating data so as to obtain a cipher text of the card communicating data, sending the cipher text of the card communicating data to the card; using the secure session key to decrypt a cipher text of a card communicating response sent from the card so as to obtain the card communicating response, returning the card communicating response to the host, then going to Step 0;

the method further comprises: when detecting that the card is removed from the terminal, identifying, by the terminal, that the secure channel is not established.

2. The method of claim 1, wherein acquiring the original card data specifically comprises: determining, by the terminal, a type of the original card data according to the instruction for establishing the secure channel, if the type is a first type, determining the original card data according to a first type card data; while if the type is a second type, determining the original card data according to a second type card data;

determining, by the terminal, the type of the original card data according to the instruction for establishing the secure channel specifically comprises: determining, by the terminal, the type of the original card data according to a preset byte in a sequence of bytes of the instruction for establishing the secure channel, if a datum on the preset byte is a sixth preset datum, the type of the original card data is a first type; while if the datum on the preset byte is a seventh preset byte datum, the type of the original card data is a second type;

determining the original card data according to the first type of card data specifically comprises: receiving, by the terminal, a first type of card data, coding the first type of card data so as to obtain the original card data; or, receiving, by the terminal, the first type of card data from the instruction for establishing the secure channel, if the first type of card data are acquired from the instruction for establishing the secure channel, recording the first type of card data as the original card data; and determining the original card data according to the second type of card data specifically comprises: acquiring, by the terminal, the second type of card data from the instruction for establishing the secure channel, and computing the second type of card data so as to obtain the original card data.

3. The method of claim 1, wherein acquiring the original card data specifically comprises: receiving, by the terminal, a first type of card data input, and coding the first type of card data so as to obtain the original card data.

4. The method of claim 1, wherein in Step 1, acquiring the original card data specifically comprises: judging, by the terminal, whether a first type of card data exists in the instruction for establishing the secure channel, if yes, determining the original card data according to the first type of card data, otherwise, receiving the first type of card data input.

5. The method of claim 1, wherein in Step 1, acquiring the original card data specifically comprises: acquiring, by the terminal, second type card data from the instruction for establishing the secure channel, and computing the second type card data so as to obtain the original card data.

6. The method of claim 1, wherein Step 2 further comprises: sending, by the terminal, an instruction for selecting a document to the card, judging a type of a document selecting response returned from the card, if the type is a correct response, executing the card parameter acquired; if the type is an error response, reporting an error to the host, and waiting for receiving a new instruction sent from the host, then going to Step 0.

7. The method of claim 1, wherein in Step 2, determining an objective identifier according to the card parameter specifically comprises: sending, by the terminal, an instruction for acquiring a parameter to the card, acquiring card objective identifier zone data from a parameter acquiring response returned from the card, acquiring a preset terminal objective identifier list; determining an objective identifier according to the card objective identifier zone data and the terminal objective identifier list, and acquiring the data package corresponding to the objective identifier determined.

8. The method of claim 1, wherein in Step 2, before acquiring the original card data, the method further comprises: sending, by the terminal, to the card an objective identifier instruction comprising the objective identifier; and when receiving an objective identifier response, acquiring the original card data.

9. The method of claim 1, wherein Step 2 comprises the following steps:

M01) sending, by the terminal, an instruction for acquiring a parameter to the card; determining an objective identifier according to a parameter acquiring response returned from the card, acquiring the data package corresponding to the objective identifier; and acquiring the original card data;

M02) obtaining, by the terminal, the derived key according to the second parameter package preset, the original card data and the data package; reading the cipher text of the random data from the card; using the derived key to decrypt the cipher text of the random data so as to obtain card random data;

M03) generating, by the terminal, first random data in the random data package; obtaining a first terminal public key according to the first random data, the first parameter package preset and the data package; reading a first card public key from the card according to the first terminal public key; obtaining a first mapping data package according to the first card public key, the first random data, the card random data, the first parameter package and the data package, and updating the first parameter package according to the first mapping data package;

M04) generating, by the terminal, second random data in the random data package; obtaining a second terminal public key according to the second random data, the first parameter package updated and the data package; reading a second card public key from the card according to the second terminal public key; and obtaining a second shared key according to the second card public key, the second random data, the first parameter package updated and the data package; and M05) obtaining, by the terminal, the session key package according to the second parameter package, the second shared key and the data package.

10. The method of claim 9, wherein in Step M02, reading the cipher text of the random data from the card specifically comprises: sending, by the terminal, an instruction for exchanging a random number to the card; and when receiving a random number exchanging response returned from the card, obtaining the cipher text of the random data from the random number exchanging response.

11. A terminal for reading a card, comprising: a means for receiving, a first means for determining, a first means for judging, a first means for acquiring, a second means for determining, a second means for acquiring, a third means for acquiring, a first means for obtaining, a fourth means for acquiring, a first means for decrypting, a means for generating, a second means for obtaining, a means for updating, a third means for obtaining, a fourth means for obtaining, a means for reading, a second means for judging, a means for identifying, a fifth means for obtaining, a third means for judging, a means for executing, a fifth means for acquiring, a sixth means for acquiring, a means for encrypting, a second means for decrypting and a means for sending;

the means for receiving is configured to receive an instruction sent from a host;

the first means for determining is configured to determine a type of the instruction received by the means for receiving;

the first means for judging is configured to judge whether a secure channel is established-if, whenever the first means for determining determines that the type of the instruction is an instruction for building a secure channel;

the means for sending is configured to send information that the secure channel is established successfully to the host if the first means for judging judges that the secure channel is established;

the first means for acquiring is configured to acquire a card parameter of the card if the first means for judging judges that the secure channel is not established;

the second means for determining is configured to determine an objective identifier according to the card parameter acquired by the first means for acquiring;

the second means for acquiring is configured to acquire a data package comprising functions and corresponding to the objective identifier determined by the second means for determining;

the third means for acquiring is configured to acquire original card data stored in the card;

the first means for obtaining is configured to obtain a derived key using a key derivation function according to a second parameter package preset, the original card data obtained by the third means for acquiring and the data package acquired by the second means for acquiring;

the fourth means for acquiring is configured to acquire a cipher text of random data from the card;

the first means for decrypting is configured to obtain card random data by decrypting the cipher text of random data acquired by the fourth means for acquiring according to the derived key acquired by the first means for obtaining;

the means for generating is configured to generate a random data package;

the second means for obtaining is configured to obtain a mapping data package according to the card random data obtained by the first means for decrypting, the random data package generated by the means for generating, a first parameter package preset and the data package acquired by the second means for acquiring;

the means for updating is configured to update the first parameter package according to the mapping data package obtained by the second means for obtaining;

the third means for obtaining is configured to obtain a session key package according to the random data package, the first parameter package updated by the means for updating, and the second parameter package;

the fourth means for obtaining is configured to obtain a terminal authenticated token according to the session key package obtained by the third means for obtaining and the function package acquired by the second means for acquiring;

the means for reading is configured to read a card authenticated token from the card according to the terminal authenticated token obtained by the fourth means for obtaining;

the second means for judging is configured to judge whether the secure channel is established successfully according to the terminal authenticated token read by the means for reading and the card authenticated token obtained by the fourth means for obtaining;

the means for identifying is configured to identify that the secure channel is established if a judging result of the second means for judging is yes;

the fifth means for obtaining is configured to obtain a secure session key according to the session key package obtained by the third means for obtaining and store the secure session key if the judging result of the second means for judging is yes;

the means for sending is further configured to send information that establishing the secure channel is successful to the host if the fifth means for obtaining obtains the secure session key and stores the secure session key;

the means for sending is further configured to send information that establishing the secure channel is failed to the host if the judging result of the second judging means is no;

the third means for judging is configured to judging whether the secure channel is established if the first means for determining determines that the type of the instruction is an instruction for card communicating;

the means for executing is configured to execute a standard communication between a terminal and the card if a judging result of the third means for judging is no;

the fifth means for obtaining is configured to obtain card communicating data from the instruction for card communicating;

the sixth means for obtaining is configured to obtain the stored secure session key;

the means for encrypting is configured to use the secure session key to encrypt the card communicating data so as to obtain a cipher text of the card communicating data if the judging result of the third means for judging is yes;

the means for sending is further configured to send the cipher text of the card communicating data encrypted by the means for encrypting to the card;

the second means for decrypting is configured to use the secure session key acquired by the sixth means for acquiring to decrypt a cipher text of a card response to communication sent from the card so as to obtain the card response;

the means for sending is further configured to return the card response decrypted by the second means for decrypting back to the host; and the means for identifying is further configured to identify that the secure channel is not established when detecting that the card is removed from the terminal.

12. The terminal of claim 11, wherein the third means for acquiring is specifically configured to determine a type of the original card data according to the instruction for building the secure channel, if the type is a first type, determining the original card data according to a first type of card data in the instruction; while if the type is a second type, determining the original card data according to a second type of card data in the instruction, that the third means for acquiring is configured to determine a type of the original card data according to the instruction for establishing a secure channel specifically is: the third means for acquiring is configured to determine the type of the original card data according to a preset byte in the instruction for building the secure channel, if an datum of the preset byte is a sixth preset datum, the type of the original card data is a first type; while if the datum of the preset byte is a seventh preset data, the type of the original card data is a second type, that the third means for acquiring is configured to determine the original card data according to the first type of card data specifically is: the third means for acquiring is configured to receive the first type of card data input, code the first type of card data so as to obtain the original card data; or, to acquire first type card data from instruction for building the secure channel, to record the first type card data as the original card data if the first type card data are acquired from the instruction for building the secure channel; and that the third means for acquiring is configured to determine the original card data according to the second type of card data specifically is: the third means for acquiring is configured to acquire the second type of card data from the instruction for building the secure channel, and compute the second type of card data so as to obtain the original card data.

13. The terminal of claim 11, wherein the third means for acquiring specifically is configured to receive the first type card data input, code the first type card data so as to obtain the original card data.

14. The terminal of claim 11, wherein the third means for acquiring specifically is configured to judge whether the first type card data exist in the instruction for building the secure channel, if yes, determining the original card data according to the first type card data, otherwise, receiving the first type card data input.

15. The terminal of claim 11, wherein the third means for acquiring specifically is configured to acquire the second type card data from the instruction for building the secure channel, and compute the second type card data so as to obtain the original card data.

16. The terminal of claim 11, wherein the means for sending is further configured to send an instruction for selecting a document to the card;

the fourth means for judging is configured to judge a type of a document selecting response returned from the card;

the first means for acquiring is specifically configured to acquire a card parameter if the fourth means for judging judges that the type of the document selecting response returned from the card is a correct response; and the means for sending is further configured to report an error to the host, and wait for receiving a new instruction sent from the host if the fourth means for judging judges that the type of the document selecting response returned from the card is an error response.

17. The terminal of claim 11, wherein the second means for determining specifically is configured to send an instruction for acquiring the parameter to the card, acquire card objective identifier zone data from a parameter acquiring response returned from the card, acquire a preset terminal objective identifier list;

determine an objective identifier according to the card objective identifier zone data and the terminal objective identifier list, and acquire the function package corresponding to the determined objective identifier.

18. The terminal of claim 11, wherein the third means for obtaining is further configured to send an objective identifier instruction comprising the objective identifier to the card; and when receiving an objective identifier response, acquiring the acquired original card data.

19. The terminal of claim 11, wherein the means for sending is further configured to send an instruction for acquiring the parameter to the card;

the first means for acquiring specifically is configured to acquire a parameter acquiring response returned from the card if the first means for judging judges that the secure channel is not established;

the second means for determining specifically is configured to determine an objective identifier according to the parameter acquiring response returned from the card;

the means for generating comprises a first unit for generating and a second unit for generating;

the first unit for generating is configured to generate first random data in a random data package;

the second means for obtaining specifically is configured to obtain a first terminal public key according to the first random data generated by the first unit for generating, a first parameter package preset and the function package acquired by the second means for acquiring; read a first card public key from the card according to the first terminal public key; and obtain first mapping data package according to the first card public key, the first random data generated by the first unit for generating, the card random data acquired by the fourth means for acquiring, the first parameter package and the function package acquired by the second means for acquiring;

the means for updating specifically is configured to update the first parameter package according to the first mapping data package acquired by the second means for obtaining;

the second unit for generating is configured to generate second random data in the random data package;

the third means for obtaining specifically is configured to obtain a second terminal public key according to the second random data acquired by the second unit for generating, the first parameter package updated by the means for updating and the function package acquired by the second means for acquiring; read a second card public key from the card according to the second terminal public key; obtain a second shared key according to the second card public key, the second random data generated by the second unit for generating, the first parameter package updated by the means for updating and the function package acquired by the second means for acquiring; and obtain the session key package according to the second parameter package, the second shared key and the function package acquired by the second means for acquiring.

20. The terminal of claim 19, wherein the fourth means for acquiring specifically is configured to send an instruction for exchanging a random number to the card; and when receiving a random number exchanging response returned from the card, obtaining the cipher text of the random data from the random number exchanging response.

* * * * *